(12) United States Patent
Stolle (10) Patent No.: US 10,308,090 B2
(45) Date of Patent: Jun. 4, 2019

(54) MOTOR VEHICLE CHASSIS

(71) Applicant: HOERBIGER AUTOMOTIVE KOMFORTSYSTEME GMBH, Schongau (DE)

(72) Inventor: Klaus Stolle, Schwabniederhofen (DE)

(73) Assignee: HOERBIGER AUTOMOTIVE KOMFORTSYSTEME GMBH, Schongau (DE)

( * ) Notice: Subject to any disclaimer, the term of this patent is extended or adjusted under 35 U.S.C. 154(b) by 0 days.

(21) Appl. No.: 15/977,037

(22) Filed: May 11, 2018

(65) Prior Publication Data

US 2018/0257450 A1 Sep. 13, 2018

Related U.S. Application Data (63) Continuation of application No. PCT/EP2016/077156, filed on Nov. 9, 2016.

(30) Foreign Application Priority Data

Nov. 13, 2015 (DE) .................... 10 2015 119 638.7

(51) Int. Cl.
*B60G 17/027* (2006.01)
*B60G 15/06* (2006.01)

(52) U.S. Cl.
CPC ......... *B60G 17/0272* (2013.01); *B60G 15/06* (2013.01); *B60G 15/062* (2013.01);
(Continued)

(58) Field of Classification Search
CPC .............. B60G 17/0272; B60G 15/062; B60G 2202/312; B60G 2202/42; B60G 2500/30; B60G 2202/416
See application file for complete search history.

(56) References Cited

U.S. PATENT DOCUMENTS 5,181,696 A 1/1993 Abe
5,996,978 A * 12/1999 Asanuma ........... B60G 17/0408
188/315
(Continued)

FOREIGN PATENT DOCUMENTS

DE 32 23 195 A1 12/1983
DE 198 55 310 A1 6/2000
(Continued)

OTHER PUBLICATIONS

International Search Report issued by the European Patent Office for corresponding International Patent Application No. PCT/EP2016/077156, dated Jan. 24, 2017, with an English translation.
(Continued)

*Primary Examiner* — Darlene P Condra
(74) *Attorney, Agent, or Firm* — Myers Wolin, LLC (57) ABSTRACT

In a motor vehicle chassis, all four wheel suspensions each have associated therewith a hydraulic height adjustment device having a cylinder-piston arrangement which acts on a base point of the relevant spring and is supplied by a decentral hydraulic aggregate. The hydraulic height adjustment devices each comprise a complex, integrated electrohydraulic adjustment assembly comprising the allocated hydraulic aggregate and the associated cylinder-piston arrangement and having a specific adapter into which the allocated cylinder-piston arrangement is integrated in such a way that there are no exposed hydraulic lines between the allocated hydraulic pump and the associated cylinder-piston arrangement. The front wheel height adjustment devices and the rear wheel height adjustment devices differ in terms of the adapter.

6 Claims, 7 Drawing Sheets

(52) U.S. Cl.
CPC .... *B60G 2202/30* (2013.01); *B60G 2202/312* (2013.01); *B60G 2202/413* (2013.01); *B60G 2202/416* (2013.01); *B60G 2202/42* (2013.01); *B60G 2500/30* (2013.01)

(56) References Cited

U.S. PATENT DOCUMENTS

| | | | | |
|---|---|---|---|---|
| 2008/0111334 | A1* | 5/2008 | Inoue | B60G 17/021 |
| | | | | 280/124.1 |
| 2009/0108546 | A1 | 4/2009 | Ohletz et al. | |
| 2011/0101632 | A1* | 5/2011 | Mochizuki | B60G 17/027 |
| | | | | 280/6.157 |
| 2013/0068550 | A1* | 3/2013 | Gale | B60G 3/145 |
| | | | | 180/216 |
| 2013/0249183 | A1* | 9/2013 | Ellifson | B60G 13/08 |
| | | | | 280/124.157 |
| 2014/0306409 | A1 | 10/2014 | Kazmirski et al. | |
| 2014/0312580 | A1* | 10/2014 | Gale | B60G 21/073 |
| | | | | 280/5.509 |
| 2015/0224845 | A1* | 8/2015 | Anderson | B60G 17/019 |
| | | | | 701/37 |
| 2016/0059664 | A1* | 3/2016 | Tucker | B60G 17/04 |
| | | | | 280/124.159 |

FOREIGN PATENT DOCUMENTS

| | | |
|---|---|---|
| DE | 101 09 555 A1 | 9/2002 |
| DE | 10 2005 010 098 A1 | 9/2006 |
| DE | 10 2007 051 971 B4 | 9/2010 |
| DE | 10 2009 047 100 A1 | 5/2011 |
| EP | 0 857 871 A1 | 8/1998 |
| EP | 1236591 A2 | 9/2002 |
| EP | 2 301 773 A1 | 3/2011 |
| JP | 2010-149550 A | 7/2010 |
| WO | 2014/142160 A1 | 9/2014 |
| WO | 2016/180590 A2 | 11/2016 |

OTHER PUBLICATIONS

International Preliminary Report on Patentability, Chapter II of the PCT, for corresponding International Patent Application No. PCT/EP2016/077156 dated Oct. 26, 2017, with an English translation.

* cited by examiner

MOTOR VEHICLE CHASSIS

CROSS REFERENCE TO RELATED APPLICATIONS

This application is a continuation under 35 U.S.C. § 120 of International Application PCT/EP2016/077156, filed Nov. 9, 2016, which claims priority to German Application No. 10 2015 119 638.7, filed Nov. 13, 2015, the contents of each of which are incorporated by reference herein.

FIELD OF THE INVENTION

The present invention relates to a motor vehicle chassis comprising a basic structure and several wheels connected thereto via one wheel suspension each.

BACKGROUND

In motor vehicle chassis, the wheel suspensions, via which the wheels are connected to the basic structure, are usually a spring as well as a shock absorber. In this context, different possibilities are known as regards the construction of the spring (e.g. coil springs, leaf springs, torsion springs) as well as its spatial arrangement in relation to the other components of the wheel suspension, especially relative to the respectively associated shock absorber. A variant that is widely used, especially for steerable (front) wheels, is so-called MacPherson struts, in which a shock absorber is disposed within a spring constructed as a coil spring. In contrast, especially for non-steerable (rear) wheels, wheel suspensions in which a shock absorber is disposed outside a spring—constructed as a coil spring—i.e. alongside it at more or less distance, can be found to a considerable extent.

It is further known that motor vehicles can be equipped with a height-positioning device, in order that, if necessary, the ground clearance can be increased (e.g. for driving onto ramps or the like) or the basic structure can be lowered (e.g. for fuel economy during highway driving). Typically, although not imperatively, this height-positioning device engages in one of the foot points of the spring of the wheel suspension in question and changes its position, although in principle it is not decisive whether the spring foot point associated with the basic structure or else with the wheel in question is positioned. Besides pneumatic and electrical spring-foot-point positioning drives (see, for example, DE 102007051971 B4), hydraulic spring-foot-point positioning drives in particular are known, for example from DE 3223195 A1, DE 102009047100 A1. U.S. Pat. No. 5,181,696 A, EP 2301773 A1, JP 2010-149550 A and WO 2014/142160 A1. Such a hydraulic cylinder-piston arrangement associated with the respective wheel suspension is pressurized in controlled manner with hydraulic fluid by a hydraulic aggregate. In this connection, a common central hydraulic aggregate may be provided for several wheel suspensions, or else several individual, decentralized hydraulic aggregates associated with the respective wheel suspension may be provided, which respectively pressurize only one single hydraulic cylinder-piston arrangement. Such a hydraulic spring-foot-point positioning drive is disclosed as part of a motor vehicle spring strut with positionable preload by DE 10109555 A1, for example.

In view of the prior art mentioned in the foregoing, the present invention is directed toward providing a motor vehicle chassis of the type mentioned in the introduction, in which an operationally safe and efficient possibility of positioning the height of the chassis above the roadway is achieved at relatively low costs and using a particularly small installation space for the hydraulic height-positioning device.

SUMMARY

According to the present disclosure, this object may be achieved by a motor vehicle chassis comprising a basic structure, two front wheels connected thereto via one front-wheel suspension each and two rear wheels connected thereto via one rear-wheel suspension each, wherein each of the two front-wheel suspensions is provided at least with one spring associated with the front wheel in question and at least one shock absorber associated with the front wheel in question in a first spring-shock-absorber arrangement and each of the two rear-wheel suspensions is provided at least with one spring associated with the rear wheel in question and at least one shock absorber associated with the rear wheel in question in a second spring-shock-absorber arrangement different from the first spring-shock-absorber arrangement, with the following features:

respectively one hydraulic height-positioning device with a cylinder-piston arrangement acting on a foot point of the spring in question is associated with all four wheel suspensions;

the cylinder-piston arrangement can be pressurized respectively by a hydraulic aggregate comprising a decentralized hydraulic pump associated with the wheel in question and respectively driven by an electric motor;

each hydraulic height-positioning device comprises a complex, integrated electrohydraulic positioning assembly comprising the respective hydraulic aggregate and the associated cylinder-piston arrangement, with a specific adapter, in which the respective cylinder-piston arrangement is integrated in such a way that no exposed hydraulic lines of any kind exist between the respective hydraulic pump and the associated cylinder-piston arrangement;

the cylinder-piston arrangement comprises respectively an annular hydraulic working chamber;

an annular hydraulic-fluid storage container that changes its volume inversely relative to the annular working chamber is disposed axially offset from the annular hydraulic working chamber of the cylinder-piston arrangement;

the hydraulic height-positioning devices of the front wheels and the hydraulic height-positioning devices of the rear wheels differ with respect to the adapter.

During implementation, it is possible to provide a motor vehicle chassis having four wheels—each connected via an associated wheel suspension to a basic structure—which despite differently designed wheel suspensions for the front and rear wheels has, for relatively low costs, and covering all four wheels, complete chassis-height positioning, which is very compact due to the hydraulic mode of operation and is nevertheless highly dynamic, operationally safe and efficient on the basis of the decentralized hydraulic aggregate associated with the respective wheel. In order to raise the basic structure, hydraulic fluid is pumped by means of the hydraulic aggregate into the hydraulic working chambers of the four cylinder-piston arrangements (from one associated hydraulic-fluid storage container each); to lower the basic structure (by virtue of its own weight), it is typically sufficient to open a return-flow path between the respective hydraulic working chamber and the associated hydraulic-fluid storage container (which is typically vented, i.e. open to atmospheric pressure) (see DE 102014018788), although active return flow by means of the hydraulic aggregate may also be considered alternatively. The fact that the annular hydraulic-fluid storage container (which is typically vented, i.e. unpressurized), which preferably is likewise integrated into the adapter in such a way that no exposed lines of any kind exist between it and the associated hydraulic pump, associated with the respective hydraulic aggregate, has a volume that varies inversely relative to the volume of the hydraulic working chamber of the cylinder-piston arrangement, contributes to minimizing the installation space. The height-positioning devices are able to be quite particularly compact when the cross-sectional areas of the respective working chamber and of the respective associated hydraulic-fluid storage container are identical; since in this case only a minimal equalizing volume (used to replace any leaks that may occur) is needed, because, during actuation of the height-positioning device, the volume of the hydraulic-fluid storage container is reduced by exactly the same extent as that of the hydraulic working chamber and vice versa. The extensive absence of an equalizing volume going beyond the hydraulic-fluid storage container permits realization of a quite particularly compact system.

As regards the manufacturing costs for the inventive motor vehicle chassis, it is of considerable importance that, despite differently designed wheel suspensions of the front and rear wheels, it is possible to use for them hydraulic height-positioning devices that to a considerable extent contain identical components. In particular, it is possible—in cost-reducing manner—to use identical hydraulic aggregates for the front-wheel height-positioning devices and the rear-wheel height-positioning devices, because of the fact that the height-positioning devices in question differ solely by specific adapters, some of which are matched to the specific front-wheel suspension and the others to the specific rear-wheel suspension. In this sense, the hydraulic height-positioning devices of the front wheels and the hydraulic height-positioning devices of the rear wheels are identical in design, except for the respective adapter.

It is not only a particularly economical and cost-effective height-positioning concept within a vehicle having conceptionally differently configured front-wheel and rear-wheel suspensions that the present disclosure provides. To the contrary, economic advantages transcending the vehicle (and even beyond it) are also obtained during application. This is so because the technical concept underlying the embodiments disclosed also permits, with corresponding cost benefits, extensive use of identical parts in different vehicles, by the use solely of adapters specific to the respective vehicle. Compared with systems known from the prior art, this represents a significant benefit, because in each case the complete height-positioning device can be configured as a whole for the individual vehicle.

Particularly preferably, the respective adapter then comprises a base member, which in turn is provided with a housing portion and an adapter core received therein and enclosed by the housing portion, as well as an actuating portion, which is movable relative to the base member and acts on the respective spring foot point. With this design of the respective adapter, it is possible to contribute to a quite particularly compact design when both the annular hydraulic working chamber and the annular hydraulic-fluid storage container—axially offset from one another—are constructed between the housing portion of the adapter base member and the actuating portion guided displaceably thereon or therein. Within the sense of maximizing the advantages achievable by the present embodiment (see above), it is then particularly preferable for even the adapters of the hydraulic height-positioning devices of the front wheels and the adapters of the hydraulic height-positioning devices of the rear wheels to be partly identical to one another in design, especially by providing them with identical adapter cores. In this case, the adapters of the front-wheel height-positioning devices and of the rear-wheel positioning devices differ substantially (only) by the differently constructed housing portions of the base members and the differently constructed actuating portions.

Particularly preferably, the valve system can be mounted (completely or at least predominantly) in these adapter cores, so that the achievable economic advantages also relate in particular to the valve system—which is associated with a high cost component. According to yet another particularly preferred embodiment of the invention, which is particularly advantageous from economic viewpoints, the housing of the associated hydraulic pump is respectively integrated in the adapter in such a way that the pump rotor rotates in a cavity constructed in the adapter, especially because of the fact that the pump cavity is mounted in an adapter core—which is identical for the front-wheel height-positioning devices and the rear-wheel height-positioning devices—of the respective adapter.

The adapter core is preferably cylindrically constructed and fixed sealingly in a corresponding cylindrical cavity of the housing portion of the adapter base member. In particular, the adapter core and the housing portion may be permanently joined securely and sealingly with one another by means of a shrink-fit process. By integrating fluid ducts in the separating face of adapter core and housing portion, by the fact that grooves covered by the corresponding inside face of the cavity of the housing section exist on the circumferential face of the adapter core, even hydraulic switches of complex circuitry can be mounted in minimal installation space. This permits particularly compact structures. This in turn is a central aspect for the mounting—provided according to a preferred embodiment of the invention—of decisive parts of the height-positioning device within the spring, constructed as a coil spring, of the respective wheel-bracing means.

In a preferred embodiment of the invention, in each second spring-shock-absorber arrangement, the spring is constructed as a coil spring and the shock absorber is disposed outside the spring. In such wheel suspensions, in which the respective shock absorber is disposed outside a spring constructed as a coil spring, i.e. is disposed more or less distantly alongside it, it is particularly preferred to dispose at least part of the hydraulic aggregate, especially its electric motor, within the coil spring. This permits particularly compact and nevertheless efficient and reliable height-positioning devices. In a preferred embodiment of the invention, the hydraulic cylinder-piston arrangement in this case comprises an annular hydraulic working chamber, which particularly preferably surrounds the electric motor of the hydraulic aggregate and/or its hydraulic pump, so that, particularly preferably, the annular hydraulic working chamber of the cylinder-piston arrangement is therefore also disposed (at least partly) within the coil spring. In this way, the latter is also able to protect the cylinder-piston arrangement from mechanical damage, which in turn represents an invaluable advantage in terms of reliability of the system. In the sense of the viewpoints already explained hereinabove, a (likewise) annularly constructed hydraulic-fluid storage container is then preferably provided, which particularly preferably is (also) disposed within the coil spring.

In a preferred embodiment of the invention, in the first spring-shock-absorber arrangement, the spring is also constructed as a coil spring, although in this case the shock absorber is disposed within the spring and the hydraulic aggregate respectively outside the spring. In this case, the housing portion of the base member of the adapter particularly preferably comprises a lateral projection, on which the actuating portion—offset laterally from the hydraulic aggregate—is guided displaceably. In this case also, the structural features already described hereinabove are realized particularly preferably (annular hydraulic working chamber and annular hydraulic-fluid storage container offset axially therefrom, with volume that varies inversely relative to the hydraulic working chamber; wherein both in this case surround the shock absorber so that no exposed hydraulic lines of any kind exist).

Regardless of the fact that the invention defined here relates to the interrelated configuration of the hydraulic height-positioning devices of the front-wheel as well as of the rear-wheel suspensions of a motor vehicle chassis, it is obvious that the disclosure also comprises in particular the individual isolated hydraulic height-positioning devices as well as the individual wheel suspensions equipped herewith. The Applicant reserves the right, especially in exercise of the divisional right, to claim protection also for the isolated wheel suspensions, respectively equipped with a hydraulic height-positioning device, especially for the construction, disclosed here, of the front-wheel suspension.

BRIEF DESCRIPTION OF THE DRAWING

The present invention will be explained in more detail hereinafter on the basis of preferred exemplary embodiments illustrated in the drawing. This drawing shows only what is needed to understand the present invention and not the other embodiment features—which are sufficiently known—of the motor vehicle chassis in question, i.e. only the height-positioning device of a wheel suspension—respectively in a detail view. Herein

DETAILED DESCRIPTION OF THE PREFERRED EMBODIMENTS

Figure 1:
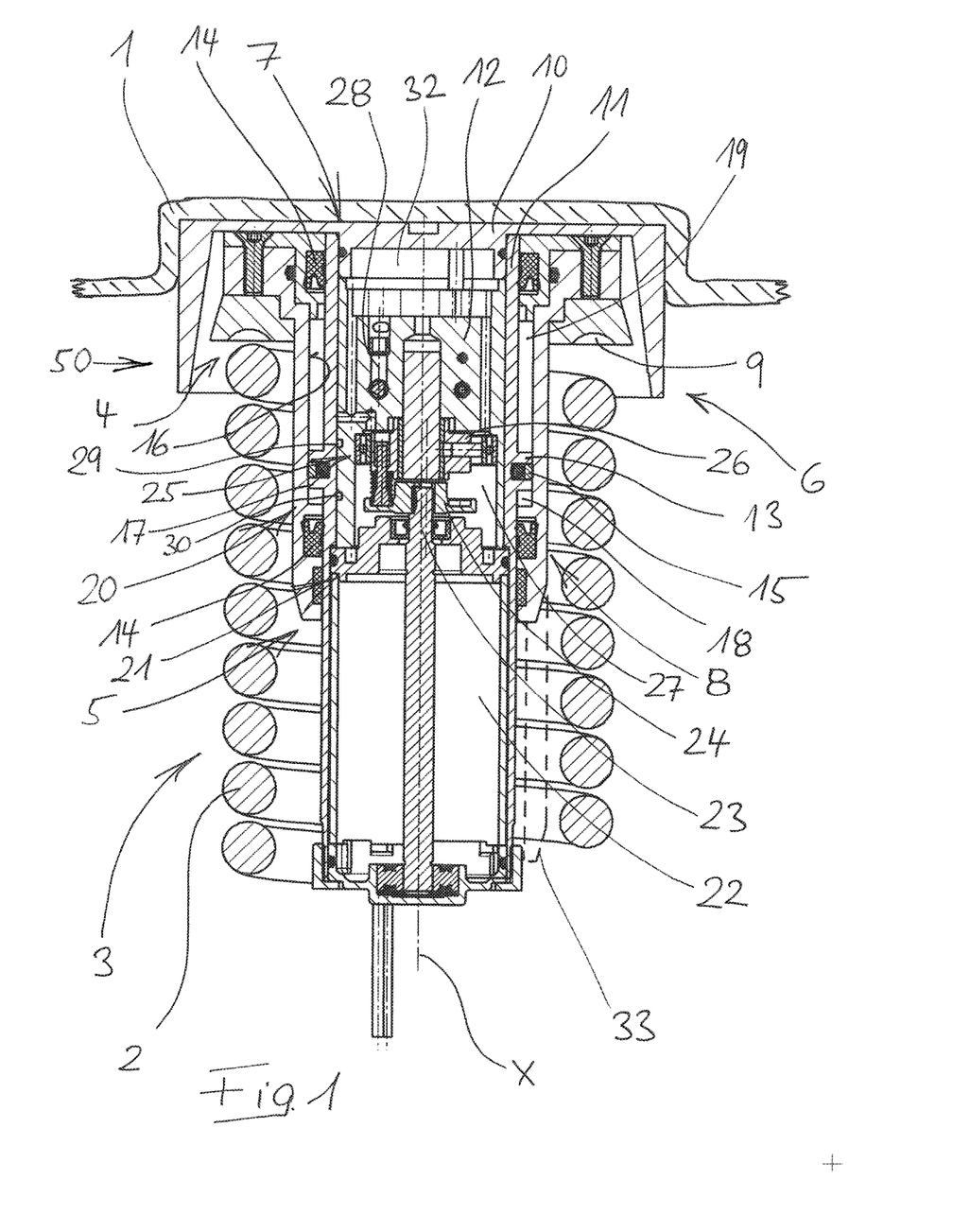
FIG. 1 shows a vertical section through a height-positioning device provided in a second spring-shock-absorber arrangement in a first configuration, which corresponds to the maximally lowered position of the chassis.
Figure 2:
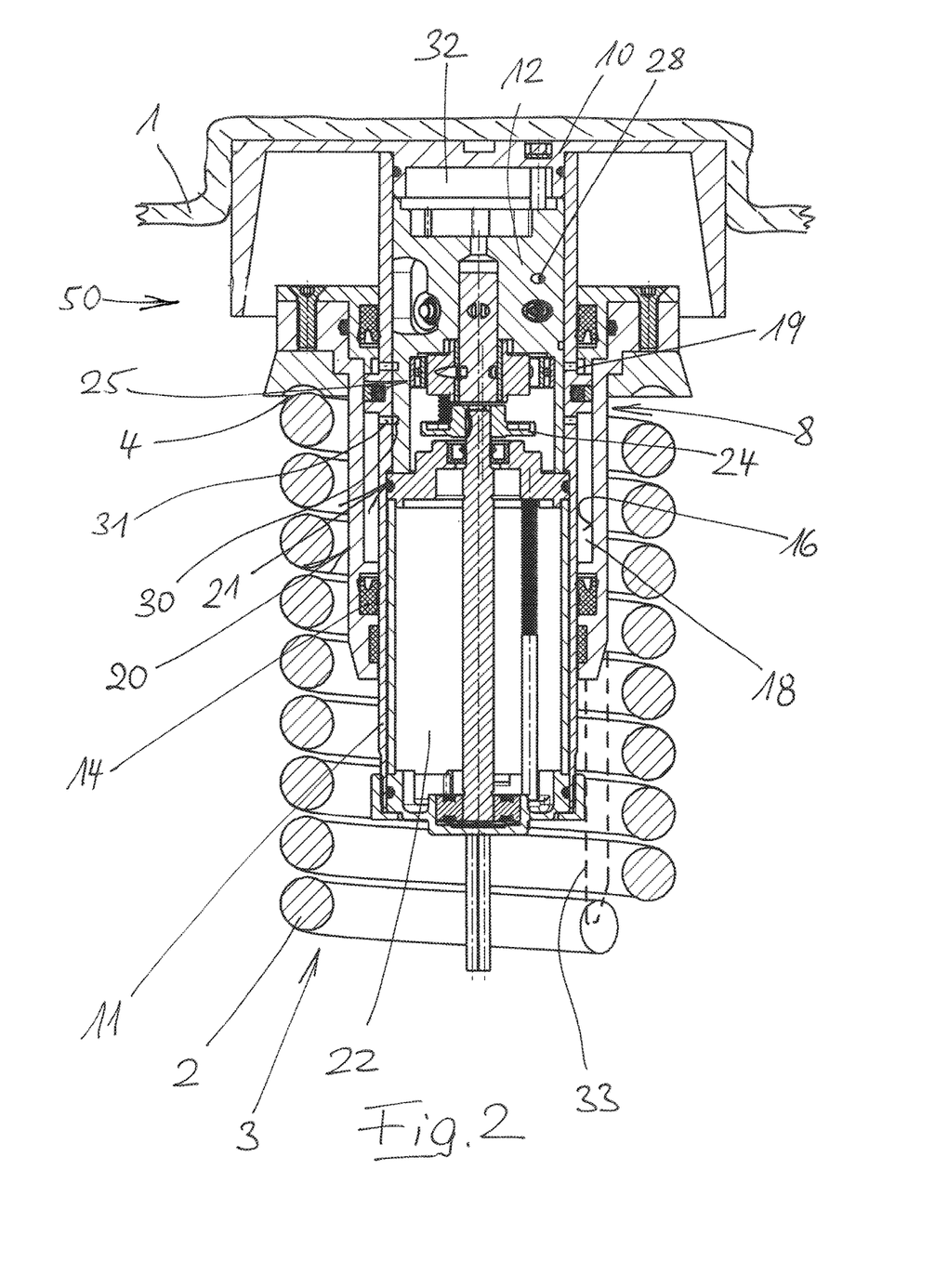
FIG. 2 shows the height-positioning device according to FIG. 1 in a second configuration, which corresponds to the maximally raised position of the chassis.

The height-positioning device illustrated in FIGS. 1 and 2 is part of a motor vehicle chassis, which corresponds as such to the generally known prior art (and therefore shown only schematically in FIG. 7), and which comprises a basic structure 1 and several wheels connected thereto via one wheel suspension each. At least that wheel suspension with which the wheel suspension shown in the drawing is associated is provided with a spring 3, constructed as a coil spring 2, and a shock absorber (not shown), disposed outside spring 3 in a second spring-shock-absorber arrangement 50.

The shown hydraulic height-positioning device acts in such a way on upper foot point 4 of coil spring 2 that the distance from upper foot point 4 of coil spring 2 to basic structure 1 of the motor vehicle chassis is variable. For this purpose, the hydraulic height-positioning device is constructed as a complex positioning assembly 5. This comprises an adapter 6, which in turn comprises in particular a base member 7 and an actuating portion 8 guided displaceably thereon. Whereas base member 7 of adapter 6 is joined to the basic structure 1 of the chassis, actuating portion 8 is provided with a spring seat 9, on which coil spring 2 is braced in the region of its upper foot point 4.

Base member 7 of adapter 6 comprises, as the main component, a bracing plate 10 serving for joining to basic structure 1, a housing portion 11 and an adapter core 12 received therein. Housing portion 11 is provided with a cylindrical surface subdivided by a shoulder 13 into an upper region and a lower region. Thereon (three-piece) actuating portion 8 is guided displaceably along axis X and specifically is sealed at top and bottom by means of seals 14. Shoulder 13 constructed on housing portion 11 is sealed from cylindrical inside face 16 of actuating portion 8 by means of O-ring 15, which is inserted in a circumferential groove. It represents an annular piston 17, which together with inside surface 16 of actuating portion 8 and the outside surface of housing portion 11 defines, in its lower and its upper region, on the one hand an annular hydraulic working chamber 18 and on the other hand an annular hydraulic-fluid storage container 19. In this sense, the regions, cooperating with one another, of housing portion 11 of adapter 6 on the one hand and of actuating portion 8 on the other hand form a hydraulic cylinder-piston arrangement 20.

Hydraulic aggregate 21 is used for pressurization of hydraulic cylinder-piston arrangement 20 of the hydraulic height-positioning device. This comprises electric motor 22 disposed within housing portion 11 and hydraulic pump 25, which is constructed as a radial piston pump and driven thereby via clutch 24—which is connected to motor shaft 23. The pump housing of hydraulic pump 25 is integrated in adapter 6, by the fact that rotor 26 of the hydraulic pump is mounted in a receiving cavity 27 constructed in adapter core 12. The connection of hydraulic pump 25 to the hydraulic system takes place via hydraulic lines or bores 28 constructed in adapter core 12 as well as via grooves 29, which are made on the surface of adapter core 12 and which, together with the inside face of housing portion 11 surrounding adapter core 12, define hydraulic flow ducts 30. Annular hydraulic working chamber 18 on the one hand and annular hydraulic-fluid storage container 19 on the other hand are connected to these flow ducts 30 via bores 31 passing through housing portion 11.

By the fact that hydraulic-fluid storage container 19 has a volume that varies inversely relative to the volume of hydraulic working chamber 18 of cylinder-piston arrangement 20, wherein—because the end face of annular piston 17 is identical at both ends—the sum of the volumes of hydraulic-fluid storage container 19 and hydraulic working chamber 18 is constant, hydraulic fluid for raising the chassis is conveyed by means of hydraulic pump 25 directly out of annular hydraulic-fluid storage container 19 and directly into hydraulic working chamber 18. For lowering the chassis (solely by means of the weight of the vehicle), a return-flow path is opened between hydraulic working chamber 18 and annular hydraulic-fluid storage container 19. A hydraulic switch suitable for this purpose is subject matter of German Patent 102014018788, for example. The necessary valve system, for example the at least one check valve used for holding the chassis at the adjusted height, is mounted in adapter core 12. Due to the direct flow of hydraulic fluid from annular hydraulic-fluid storage container 19 into annular hydraulic working chamber 18 (and vice versa), an equalizing chamber for hydraulic fluid is not necessary. Space 32 bounded by adapter core 12, housing portion 11 and bracing plate 10 therefore represents on its own a hydraulic-fluid reservoir, from which any leakage that may occur is replaced.

The special arrangement of the parts and components, discussed in the foregoing, of the hydraulic height-positioning device can be inferred directly from the drawing. In particular, it is apparent that electric motor 22 of hydraulic aggregate 21 is disposed inside helical spring 2, as is annular hydraulic working chamber 18, which otherwise—in any case when the chassis is raised—surrounds electric motor 22 of hydraulic aggregate 21. In contrast, annular hydraulic-fluid storage container 19—likewise disposed within coil spring 2—surrounds hydraulic pump 25. It is likewise apparent that, in the shown electrohydraulic positioning assembly, cylinder-piston arrangement 20 is integrated in adapter 6 in such a way that no exposed hydraulic lines of any kind exist between hydraulic pump 25 and cylinder-piston arrangement 20.

Finally, dashed lines (only on one side for reasons of clarity) indicate that actuating portion 8 can be annularly extended downward, whereby a protective tube 33 surrounding hydraulic aggregate 21 is obtained.

Figure 3:
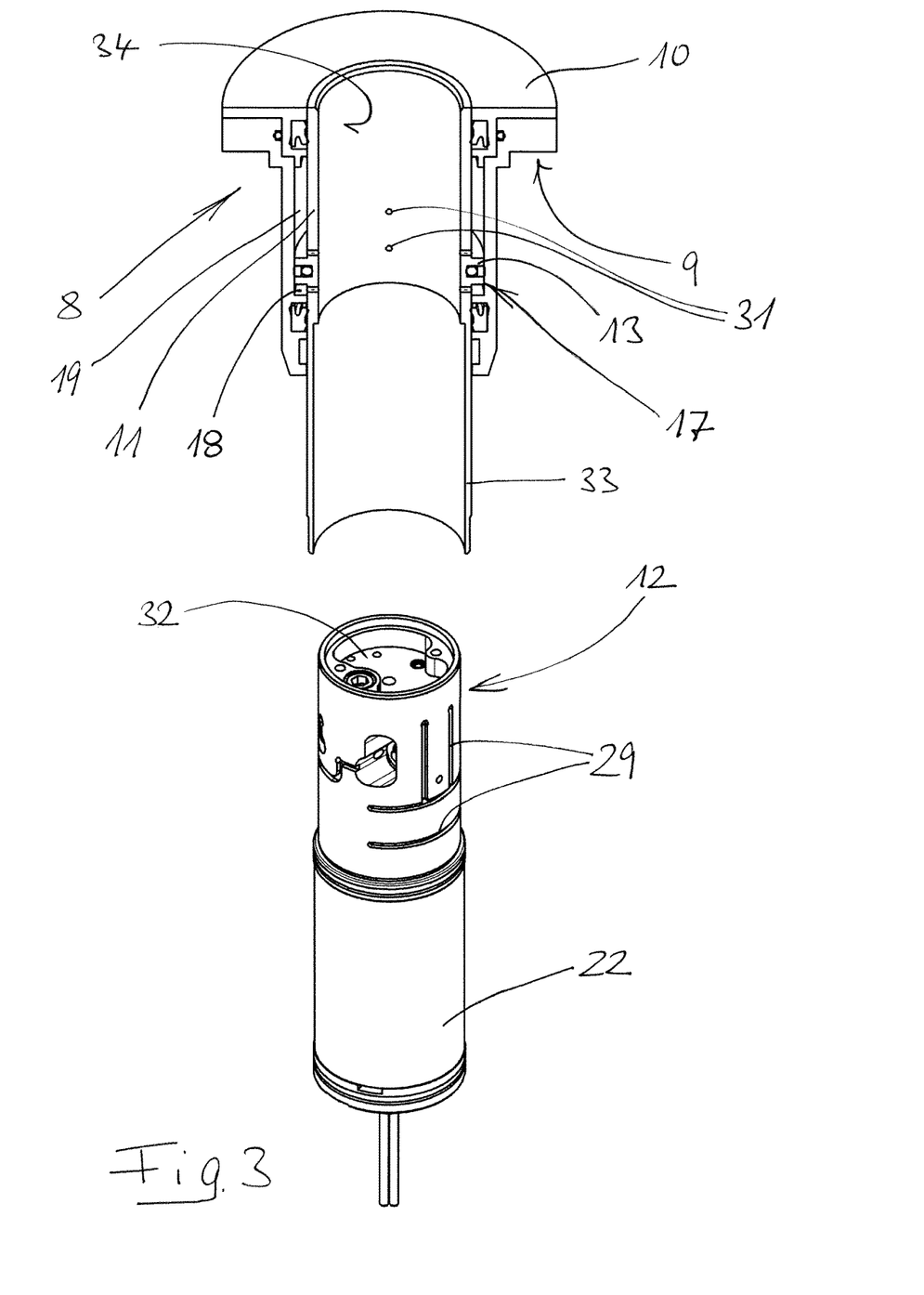
FIG. 3 shows the height-positioning device according to FIGS. 1 and 2 in a schematic exploded diagram with cutaway view of housing portion of the adapter base member and actuating portion.
Figure 4:
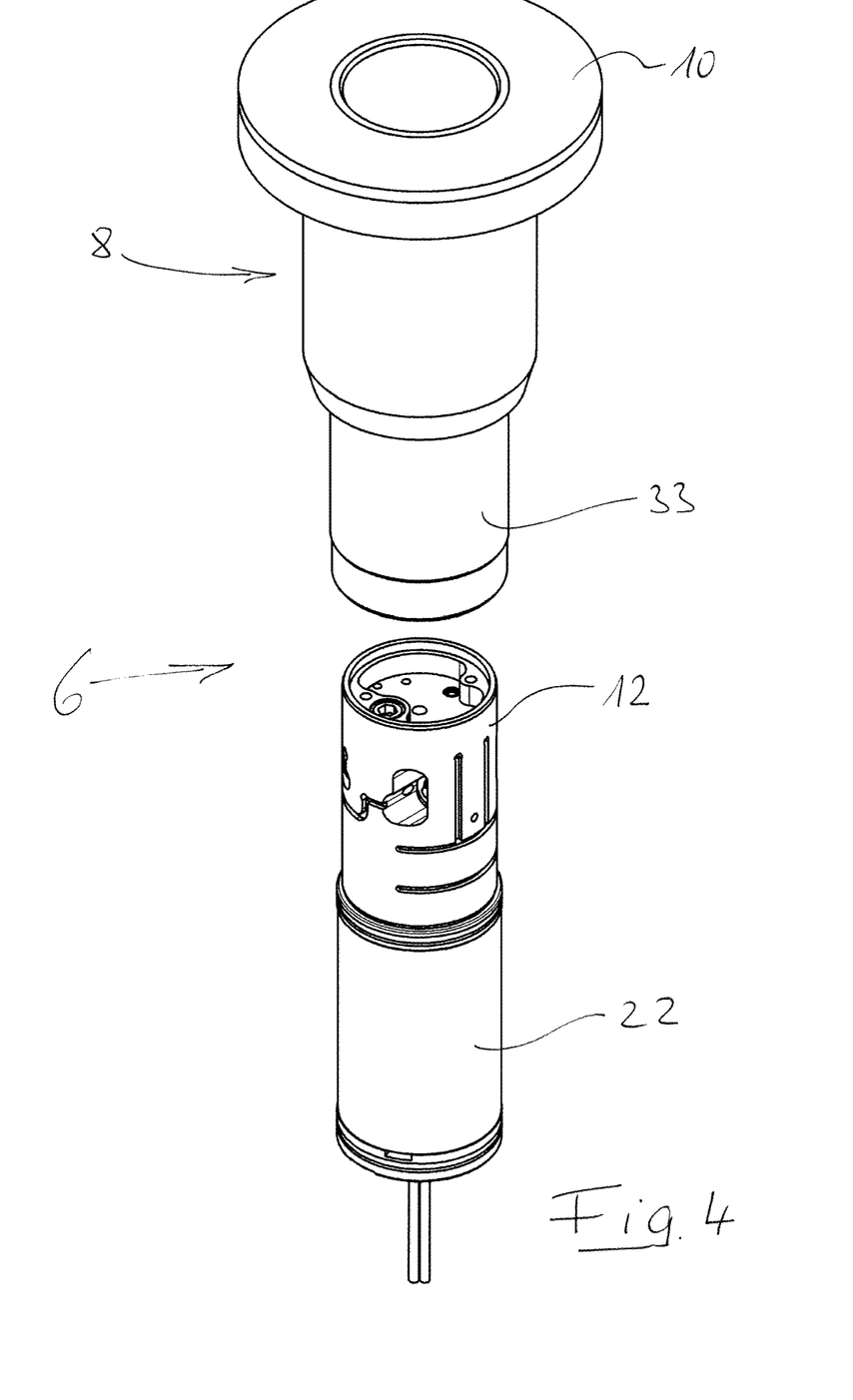
FIG. 4 shows the configuration according to FIG. 3 in an exploded diagram without cutaway views.
Figure 6:
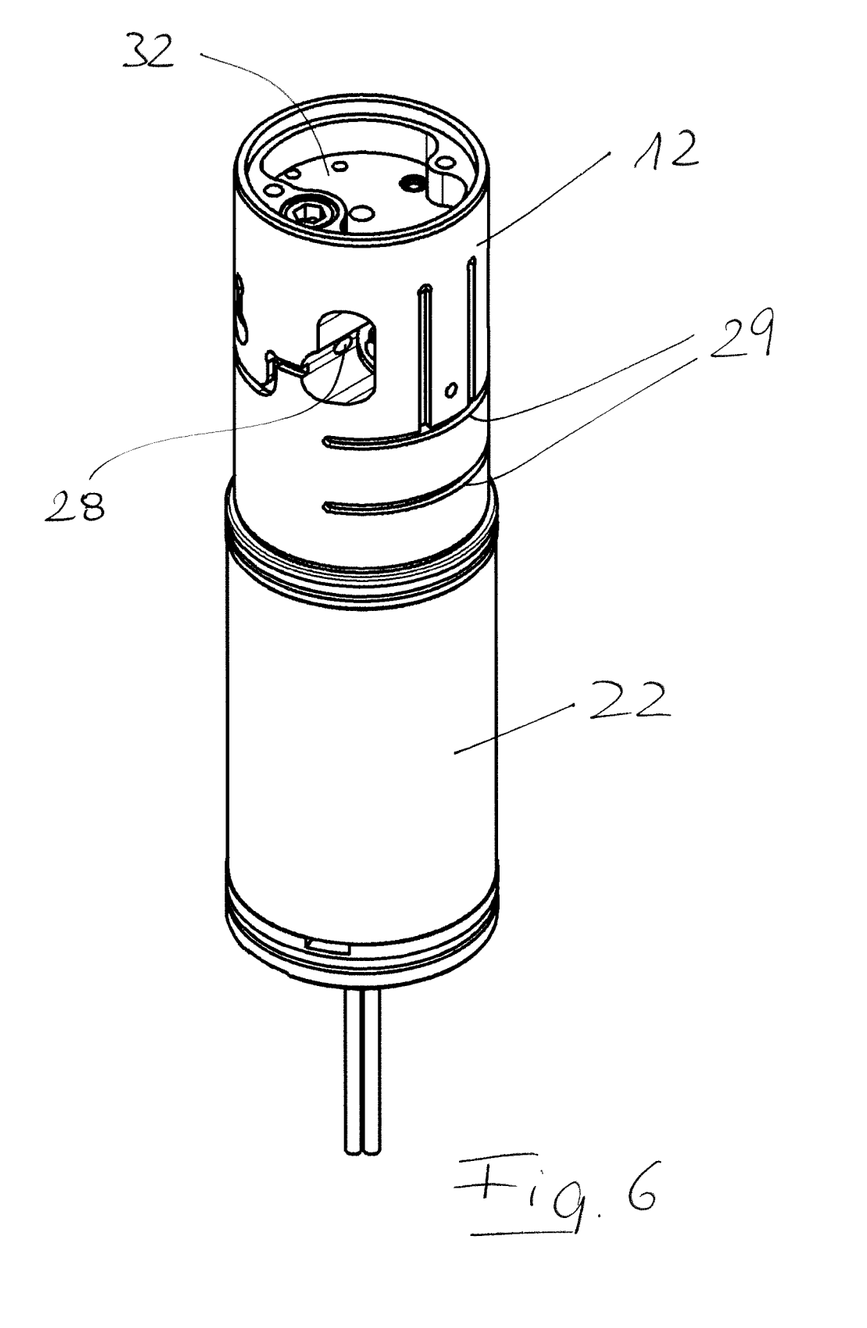
FIG. 6 shows an enlarged diagram of the components used correspondingly in the height-positioning device according to FIGS. 3 and 4 as well as in the height-positioning device according to FIG. 5.

The height-positioning device illustrated schematically according to FIGS. 3 and 4 can be understood by referring to the explanations for FIGS. 1 and 2. These diagrams (see also FIG. 6) clearly show grooves 29, which are provided externally on (cylindrical) adapter core 12 and which—when the height-positioning device is mounted—bound and define, together with (cylindrical) inside face 34 of housing portion 11 of the adapter base member, flow ducts 30, with which—via bores 31—hydraulic working chamber 18 and hydraulic-fluid storage container 19 communicate.

Figure 5:
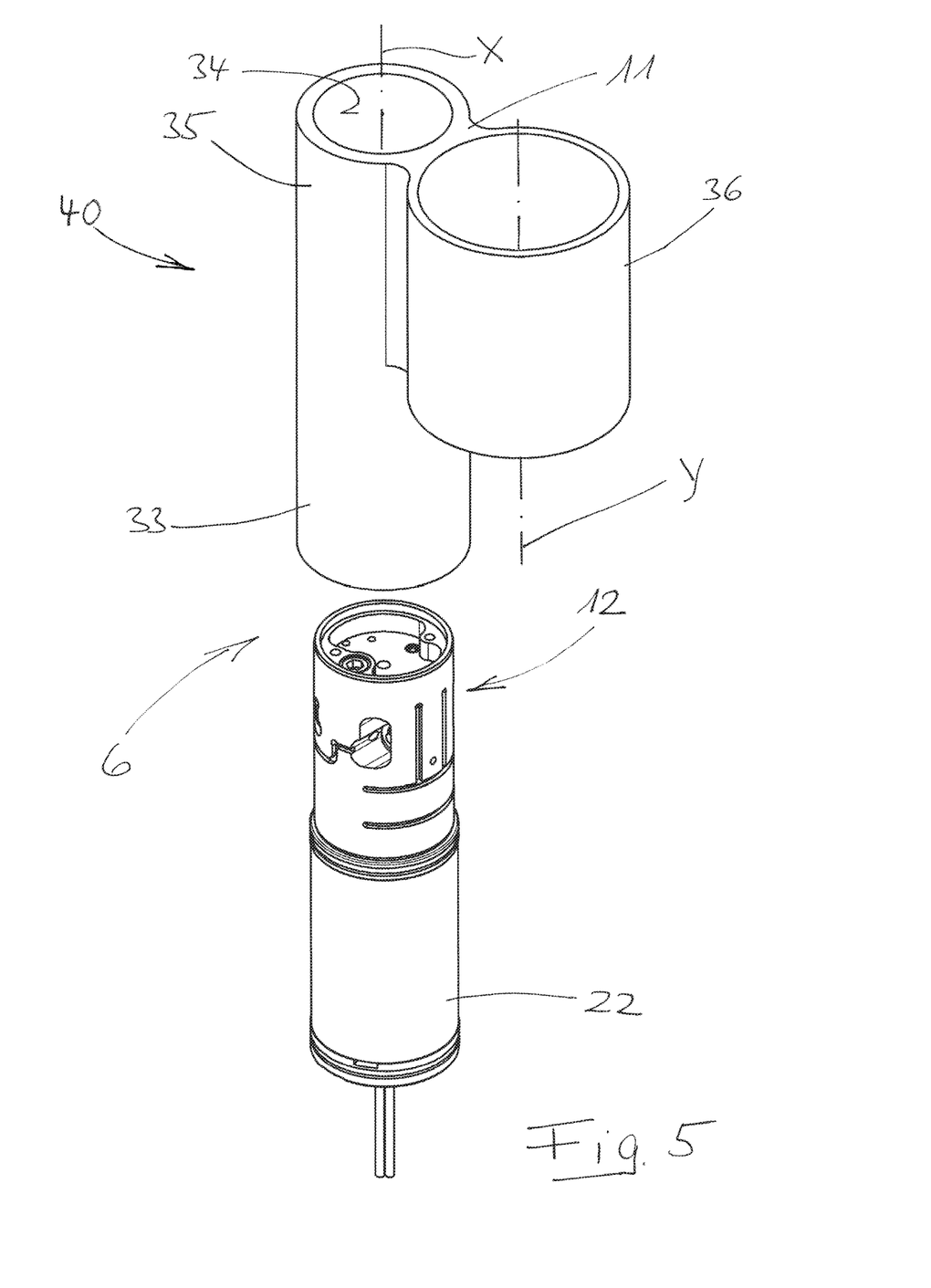
FIG. 5 shows a diagram corresponding to FIG. 4 of a height-positioning device provided in a first spring-shock-absorber arrangement.

In the height-positioning device according to FIG. 5, designed for a first spring-shock-absorber arrangement 40, which is characterized by the positioning of the shock absorber within the spring constructed as a coil spring, the identical adapter core 12 and the identical hydraulic aggregate (see FIG. 6) are used as in the height-positioning device according to FIGS. 3 and 4. However, housing portion 11 of the adapter base member as well as actuating portion 8 differ compared with the height-positioning device according to FIGS. 3 and 4. And, in fact, in the height-positioning device according to FIG. 5, housing portion 11 of the adapter base member comprises two tubular portions joined securely to one another, namely, on the one hand, a first tubular portion 35, which receives and encloses adapter core 12 and is extended downward (to protective tube 33), in order also to surround electric motor 22 of the hydraulic aggregate protectively, and, on the other hand, a second tubular portion 36—which is somewhat shorter and wider compared with first tubular portion 35. Therein the cylindrical actuating portion, not illustrated, is received displaceably along axis Y, wherein an annular hydraulic working chamber and—offset axially therefrom—an annular hydraulic-fluid storage container that changes its volume inversely relative thereto are again mounted—corresponding to the embodiment according to FIGS. 3 and 4—in the region of the separating face between second tubular portion 36 and the actuating portion. With appropriate dimensioning and other matching of the constructive details, the annular hydraulic working chamber as well as the annular hydraulic-fluid storage container are able in this way to surround both the spring constructed as a coil spring and/or the shock absorber disposed in the interior space thereof.

Figure 7:
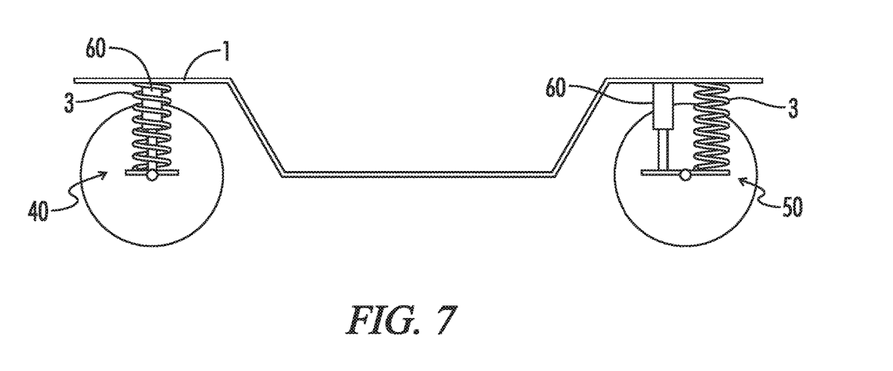
FIG. 7 shows a motor vehicle chassis with front and rear wheels connected to the chassis by way of suspensions utilizing the height-positioning devices provided herein.

FIG. 7 shows a motor vehicle chassis with front wheels connected to the basic structure by way of a first spring-shock-absorber arrangement 40 and rear wheels connected to the basic structure 1 by way of a second spring-shock-absorber arrangement 50. The first spring-shock-absorber arrangement 40 provides a shock absorber 60 disposed within the front wheel spring 3 and the second spring-shock-absorber arrangement 50 provides a shock absorber 60 disposed outside the rear wheel spring 3.

What is claimed is:

1. A motor vehicle chassis comprising:
   a basic structure (1),
   two front wheels connected thereto via one front-wheel suspension each; and
   two rear wheels connected thereto via one rear-wheel suspension each,
   wherein each of the two front-wheel suspensions is provided at least with one front wheel spring associated with a corresponding front wheel and at least one shock absorber associated with the corresponding front wheel in a first spring-shock-absorber arrangement, in which respectively the shock absorber is disposed within the front wheel spring, which is constructed as a coil spring, and each of the two rear-wheel suspensions is provided at least with one rear wheel spring (3) associated with a corresponding rear wheel and at least one shock absorber associated with the corresponding rear wheel in a second spring-shock-absorber arrangement, in which respectively the shock absorber is disposed outside the rear wheel spring, which is constructed as a coil spring, with the following features:
   respectively one hydraulic height-positioning device with a cylinder-piston arrangement (20) acting on a foot point (4) of the spring (3) in question is associated with all four wheel suspensions;
   the cylinder-piston arrangement (20) can be pressurized respectively by a hydraulic aggregate (21) comprising a decentralized hydraulic pump (25) associated with the corresponding wheel and respectively driven by an electric motor (22);
   each hydraulic height-positioning device comprises a complex, integrated electrohydraulic positioning assembly (5) comprising the respective hydraulic aggregate (21) and the associated cylinder-piston arrangement (20), with a specific adapter (6), in which the respective cylinder-piston arrangement (20) is integrated in such a way that no exposed hydraulic lines of any kind exist between the respective hydraulic pump (25) and the associated cylinder-piston arrangement (20);
   the cylinder-piston arrangement (20) comprises respectively an annular hydraulic working chamber (18);
   an annular hydraulic-fluid storage container (19) that changes its volume inversely relative to the annular working chamber (18) is disposed axially offset from the annular hydraulic working chamber (18) of the cylinder-piston arrangement (20);
   the hydraulic height-positioning devices of the front wheels and the hydraulic height-positioning devices of the rear wheels differ with respect to the adapter (6) in such a way that, in the first spring-shock-absorber arrangement, the hydraulic aggregate (21) is disposed outside the coil spring and, in the second spring-shock-absorber arrangement, at least the electric motor (22) of the hydraulic aggregate (21) is disposed within the rear wheel spring (3);

nevertheless, the hydraulic height-positioning devices of the front wheels and the hydraulic height-positioning devices of the rear wheels are identical in design, except for the respective adapter (6) and the arrangement of the height positioning devices within the corresponding spring-shock-absorber arrangements.

2. The motor vehicle chassis of claim 1, wherein the housing of the associated hydraulic pump (25) is respectively integrated in the adapter (6) in such a way that the pump rotor (26) rotates in a cavity constructed in the adapter (6).

3. The motor vehicle chassis of claim 1, wherein the hydraulic-fluid storage container (19) is respectively integrated in the adapter (6).

4. The motor vehicle chassis of claim 1, wherein the adapters (6) of the front-wheel height-positioning devices and the adapters of the rear-wheel height-positioning devices respectively comprise a base member comprising a housing portion (11) and an adapter core (12) enclosed thereby, as well as an actuating portion (8), which is movable relative thereto, wherein the adapter cores (12) of the front-wheel height-positioning devices and of the rear-wheel height-positioning devices are identical in design.

5. The motor vehicle chassis of claim 1, wherein the second spring-shock-absorber arrangement, a hydraulic working chamber (18) of the cylinder-piston arrangement (20) is respectively disposed within the rear wheel spring (3).

6. The motor vehicle chassis of claim 1, wherein, in the second spring-shock-absorber arrangement, a hydraulic-fluid storage container (19) is respectively disposed within the rear wheel spring (3).

\* \* \* \* \*